United States Patent [19]

Bacher et al.

[11] Patent Number: 5,612,749
[45] Date of Patent: Mar. 18, 1997

[54] APPARATUS AND METHOD FOR RECEIVING MESSAGES FROM A CENTRAL TRANSMITTER WITH A TELEVISION RECEIVER

[76] Inventors: Emil G. Bacher; Ida N. V. Bacher, both of Rua Comendador Bichara, No. 17, Sao Paulo, Brazil

[21] Appl. No.: 266,028

[22] Filed: Jun. 27, 1994

[51] Int. Cl.$^6$ .................................................. H04N 7/00
[52] U.S. Cl. ........................................ 348/552; 348/553
[58] Field of Search ............................... 348/552, 553, 348/467, 729, 61, 13, 465, 460; H04N 7/00

[56] References Cited

U.S. PATENT DOCUMENTS

| | | | |
|---|---|---|---|
| 4,520,392 | 5/1985 | Cox et al. | 348/467 |
| 4,989,081 | 1/1991 | Miyagawa et al. | 348/554 |
| 5,315,386 | 5/1994 | Muramoto | 348/569 |

Primary Examiner—Victor R. Kostak
Attorney, Agent, or Firm—Michael J. Striker

[57] ABSTRACT

The apparatus for receiving a message from a central transmitter with a television receiver includes a tunable radio receiver for radio signals including an encoded message transmitted from a central radio transmitter which is separate from the television receiver; a decoder for producing a decoded message signal from the received radio signal; a memory connected with the decoder for storing the decoded message signal; a signalling device advantageously including an LED for signalling the presence of the decoded message signal in memory; a converter for converting the decoded message signal to a video message signal; an RF modulator for producing a TV message signal from the video message signal and a television receiver with a television screen on which a visual message derived from the TV message signal is displayed.

9 Claims, 2 Drawing Sheets

APPARATUS AND METHOD FOR RECEIVING MESSAGES FROM A CENTRAL TRANSMITTER WITH A TELEVISION RECEIVER

BACKGROUND OF THE INVENTION

The present invention relates to an apparatus and method of receiving messages transmitted from a central transmitter with a television receiver.

There is a need for a message transmission system for sending messages to individuals which does not rely on the presence of a telephone or a FAX machine for the receipt of the message. This type of system would be useful in offices or in residences in which television sets are commonly available, but which do not have a telephone or FAX machine available for the user.

However the current television receiver will not signal or indicate that there is a special message for the viewer on another channel and furthermore the television set is not usually operated continuously for receipt of a message.

SUMMARY OF THE INVENTION

It is an object of the present invention to provide a method and apparatus for receiving a message from a central transmitter with a television receiver which does not rely on the use of the telephone.

It is another object of the present invention to provide a message transmission system for transmitting messages for display on one or more television receivers, when the television receivers are turned off.

It is an additional object of the present invention to provide an apparatus and method for transmitting a message to a television receiver which receives and stores the message and signals to indicate receipt of the message so that the television receiver can be turned on to view the message.

According to the invention the apparatus for receiving a message from a central transmitter with a television receiver comprises means for receiving a radio-frequency signal including the encoded message transmitted by a central radio transmitter; decoding means for producing a decoded message signal from the received radio-frequency signal; memory means connected with the decoding means for storing the decoded message signal; signalling means for signalling that the decoded message signal is available in the memory means and/or has been produced; modulator means for producing a TV message signal from the decoded message signal and television receiver means for producing either a visual or sound message from the TV message signal.

In a preferred embodiment of the invention the decoding means comprises digital decoding means so that the decoded message signal is a digital message signal. The apparatus also includes converter means for converting the decoded message signal first to a video message signal and the modulator means generates the TV message signal from the video message signal.

The television receiver is advantageously a conventional TV set with a television screen for displaying a visual message and audio circuit means for a sound message.

In another embodiment of the invention the converter means is not present and the TV message signal is an audio message signal which is sent to the audio circuitry of the television receiver.

According to the invention the method for receiving a message from a central transmitter with a television receiver comprises receiving a radio-frequency signal including the encoded message transmitted by a central radio transmitter with a radio receiving means; producing a decoded message signal from the received radio-frequency signal; storing the decoded message signal in a memory; signalling that the decoded message signal is available in the memory and/or has been produce; modulating the decoded message signal to produce a TV message signal and supplying the TV message signal to a television receiver and, if the TV is turned off, turning on the television receiver in response to the signalling to produce either a visual or sound message.

In a preferred embodiment of the method the decoded message signal is a digital message signal and the decoded message signal is converted to a video message signal with a converter and the video message signal is modulated with an RF modulator to produce the TV message signal which produces a visual message signal on the television screen of the television receiver.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
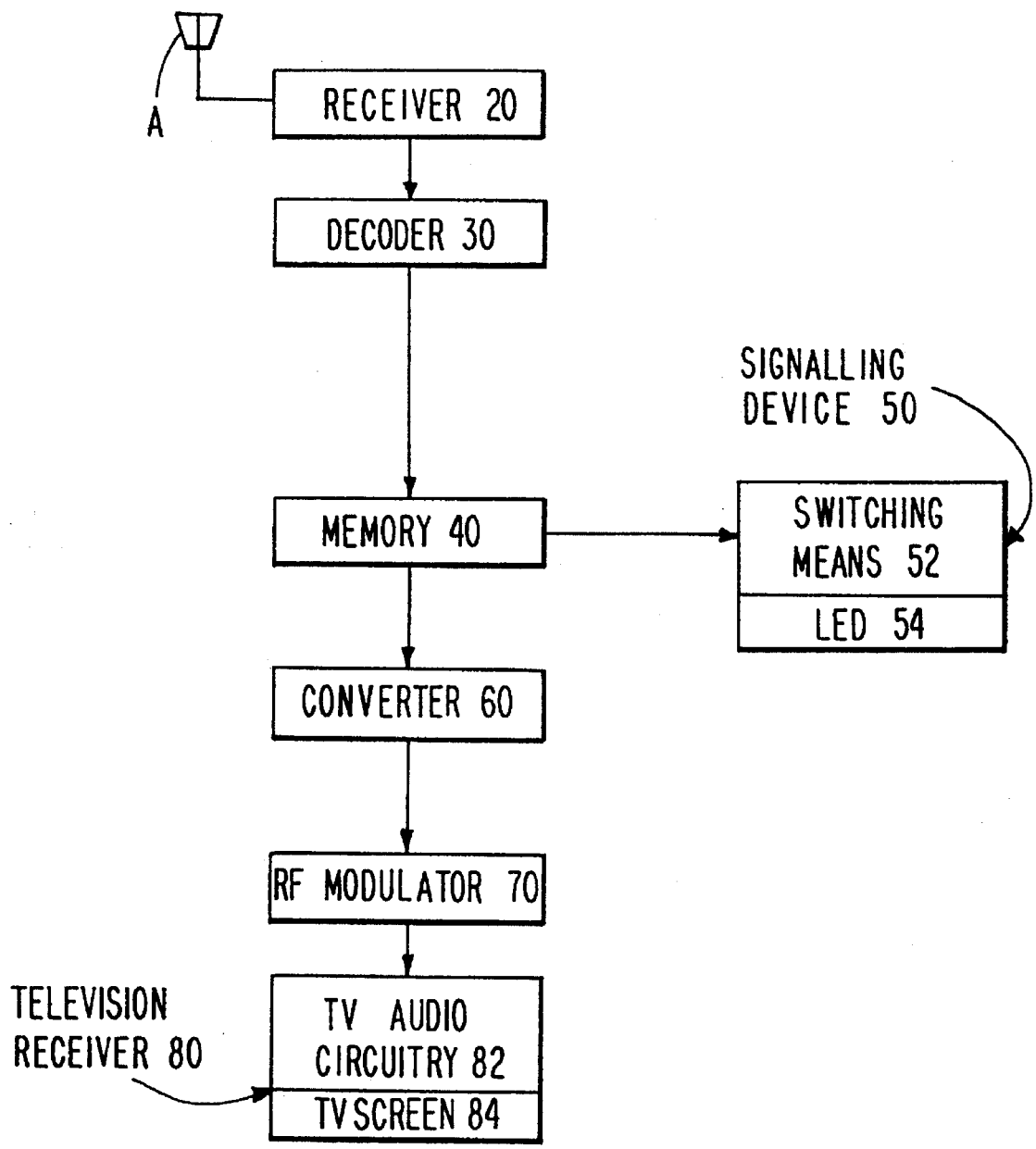
FIG. 1 is a block diagram of one embodiment of an apparatus for receiving transmitted messages according to the invention.

One embodiment of the apparatus 1 for receiving a message from a central transmitter with a television receiver is shown in FIG. 1. The apparatus 1 includes a radio frequency receiver 20 including means for tuning to various radio frequencies and for receiving a transmitted radio frequency signal including an encoded message from a central radio transmitter(not shown). The radio frequency receiver can be any of a variety of conventional type receivers which can receiver either AM or FM signals with an antenna A, although it could be a nonconventional receiver, for example, operating in the microwave region.

The receiver 20 is associated with a connected decoding circuit device 30 for producing a decoded message signal from the received electromagnetic signal with the encoded message and a memory 40 connected to the decoding circuit device 30 for storing the decoded message signal.

The apparatus 1 also includes signalling device 50 for signalling that the decoded message signal is available in the memory 40 and/or has been received and decoded. This signalling device 50 comprises in this embodiment an LED 52 (light emitting diode) and a switching circuit 54 for turning on and off the LED 52. In this embodiment the signalling device 50 is connected to the memory 40.

The apparatus 1 also includes converter 60 for converting the decoded message signal stored in the memory 40 to a video message signal and an RF modulator 70 for generating a TV message signal from the video message signal. The converter 60 is connected to the memory 40 and the RF modulator 70 is connected to the converter 60 to receiver the video message signal from it. The modulator 70 produces a TV message signal which is supplied to the television receiver 80 for visual display of the message on television screen 84.

Figure 2:
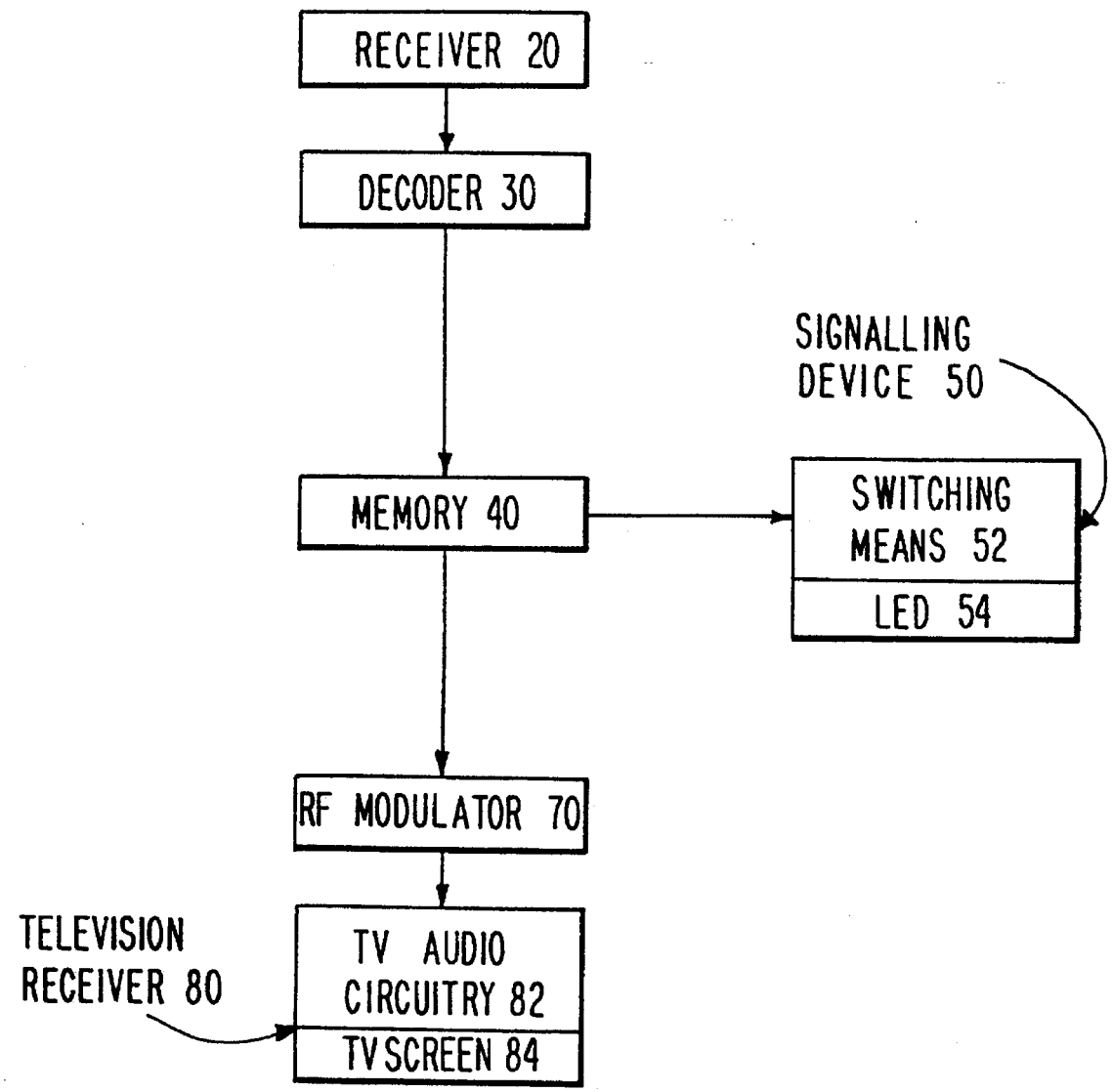
FIG. 2 is a block diagram of another embodiment of an apparatus for receiving transmitted messages according to the invention.

Another embodiment of the apparatus of the invention is shown in FIG. 2. This embodiment is the same as the previously described embodiment, except that the converter 60 is not present and the TV message signal is an audio signal which is sent to the audio circuitry 82 of the television receiver 80.

While the invention has been illustrated and described as embodied in an apparatus and method for receiving messages transmitted from a central transmitter with a television receiver, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. Apparatus for receiving a message from a central transmitter with a television receiver, said apparatus comprising means for receiving a radio-frequency signal including an encoded message transmitted by a central radio transmitter, said means for receiving the radio-frequency signal consisting of a radio receiver separate from the television receiver so that said radio receiver may be turned on when said television receiver is turned off; decoding means for producing a decoded message signal from the radio-frequency signal received by the radio receiver; memory means connected with the decoding means for storing the decoded message signal; signalling means for signalling after production of the decoded message signal by the decoding means; modulator means for producing a TV message signal from the decoded message signal and television receiver means connected to the modulator means so as to receive the TV message signal and communicate the message to a viewer.

2. Apparatus as defined in claim 1, further comprising converter means for converting the decoded message signal to a video signal, said converter means being connected between said memory means and said modulator means, and wherein said modulator means is an RF modulator and said television receiver has means for producing a visual message display on a television screen of said television receiver in response to the TV message signal.

3. Apparatus as defined in claim 1, wherein said television receiver is provided with audio circuit means and said TV message signal is transmitted to said audio circuit means to produce a sound message.

4. Apparatus as defined in claim 1, wherein said signalling means includes a light emitting diode and switching means for turning on and off said light emitting diode.

5. Apparatus as defined in claim 1, wherein said signalling means includes means for signalling when said decoded message signal is stored in the memory means.

6. Apparatus as defined in claim 1, wherein said signalling means includes means for signalling when said decoded message signal is produced by said decoding means.

7. Method of receiving a message from a central transmitter with a television receiver, said method comprising the steps of receiving a radio-frequency signal including an encoded message transmitted by a central transmitter with a radio-frequency receiving means; producing a decoded message signal from the radio-frequency signal received by the radio-frequency receiving means; storing the decoded message signal in a memory means; signalling after the decoded message signal is produced so that the television receiver can be turned on; turning on the television receiver in response to said signalling; converting the decoded message signal to a TV message signal and supplying the TV message signal to the television receiver to produce either a visual or sound message.

8. Method as defined in claim 7, wherein said signalling occurs when said decoded message signal is produced.

9. Method as defined in claim 7, wherein said signalling occurs when said decoded message signal is stored in the memory means.

* * * * *